United States Patent
Nickel et al.

(10) Patent No.: US 11,218,095 B2
(45) Date of Patent: Jan. 4, 2022

(54) METHOD FOR CONTROLLING AN ACTUATOR

(71) Applicant: Minebea Mitsumi Inc., Nagano (JP)

(72) Inventors: Daniel Nickel, Villingen-Schwenningen (DE); Ullrich Kreiensen, Deisslingen (DE); Biancuzzi Giovanni, Freiburg (DE); Fabian Armbruster, Villingen-Schwenningen (DE); Florian Bayer, Hechingen (DE)

(73) Assignee: MINEBEA MITSUMI INC., Nagano (JP)

( * ) Notice: Subject to any disclaimer, the term of this patent is extended or adjusted under 35 U.S.C. 154(b) by 121 days.

(21) Appl. No.: 16/681,194

(22) Filed: Nov. 12, 2019

(65) Prior Publication Data

US 2020/0153369 A1 May 14, 2020

(30) Foreign Application Priority Data

Nov. 12, 2018 (DE) ...................... 10 2018 128 256.7

(51) Int. Cl.
*H02P 6/16* (2016.01)
*H02P 6/08* (2016.01)
*H02P 29/40* (2016.01)
*H02P 8/24* (2006.01)

(52) U.S. Cl.
CPC .................. *H02P 6/16* (2013.01); *H02P 6/08* (2013.01); *H02P 8/24* (2013.01); *H02P 29/40* (2016.02)

(58) Field of Classification Search
CPC .... H02P 6/24; H02P 29/40; H02P 6/08; H02P 6/16; H02P 8/14; H02P 8/24
See application file for complete search history.

(56) References Cited

U.S. PATENT DOCUMENTS

| | | | | |
|---|---|---|---|---|
| 4,910,419 A | * | 3/1990 | Hayashi | F16H 25/2021 192/143 |
| 5,053,685 A | * | 10/1991 | Bacchi | G05B 19/232 318/135 |
| 5,370,011 A | * | 12/1994 | Gilges | F16H 25/20 192/143 |
| 5,634,373 A | * | 6/1997 | Cuffe | F16H 25/20 74/640 |
| 5,895,992 A | * | 4/1999 | Dreher | H02K 5/225 310/80 |
| 6,310,455 B1 | * | 10/2001 | Siraky | H02K 29/08 310/80 |

(Continued)

FOREIGN PATENT DOCUMENTS

| | | |
|---|---|---|
| DE | 10148923 A1 | 4/2003 |
| DE | 102010038101 B4 | 4/2012 |
| DE | 102011004890 A1 | 9/2012 |

*Primary Examiner* — Thai T Dinh
(74) *Attorney, Agent, or Firm* — Steven J. Grossman; Grossman, Tucker, Perreault & Pfleger, PLLC

(57) ABSTRACT

A method of controlling an actuator comprising an electric motor and an actuator coupled to the electric motor, the method comprising controlling the electric motor to move the actuator in a direction towards an absolute mechanical end stop until a last registered soft reference position has been reached and then to overtravel the last registered soft reference position by a predetermined distance, detecting the load of the actuator, and updating the registered soft reference position on the basis of the detected load.

22 Claims, 8 Drawing Sheets

(56) References Cited

U.S. PATENT DOCUMENTS

| | | | | |
|---|---|---|---|---|
| 6,674,208 | B2* | 1/2004 | Ineson | H02K 1/145 |
| | | | | 310/190 |
| 10,371,275 | B2* | 8/2019 | Lenz | F16H 25/2252 |
| 2005/0199029 | A1* | 9/2005 | Ghiran | B21D 26/033 |
| | | | | 72/71 |
| 2016/0156299 | A1* | 6/2016 | Romanowich | H02P 29/60 |
| | | | | 318/400.21 |
| 2017/0293293 | A1* | 10/2017 | Brownie | G05B 23/0275 |

* cited by examiner

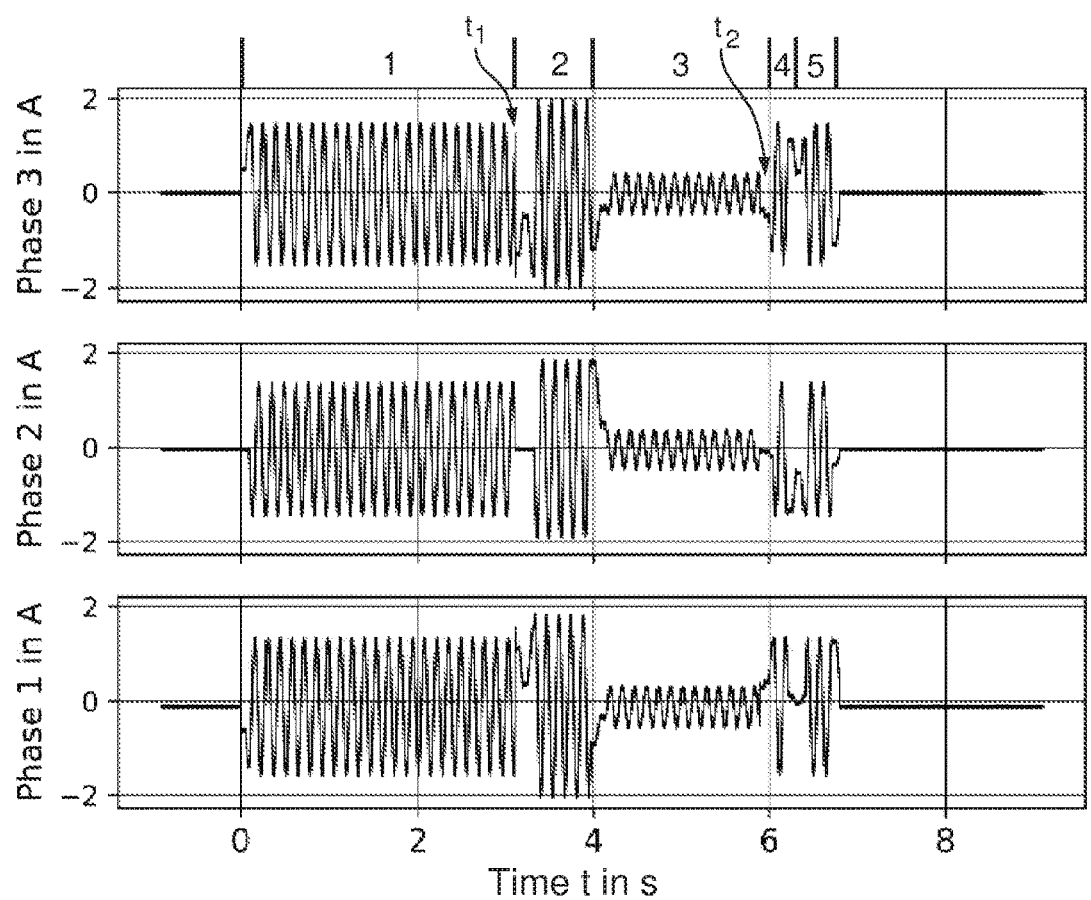

METHOD FOR CONTROLLING AN ACTUATOR

BACKGROUND

Actuators enable the positioning of an actuating element with the aid of electric control signals and are therefore variously applied in the automation of technical apparatus. Usually the movement of an electric motor is transferred to a movement of the actuating element so that the provision of a rotary frequency or a number of commutating steps on the electric motor can result in any absolute or relative position of the actuating element.

An application requiring a precision of the adjustability function together with a high resilience, is the reliable positioning of the opening degree of needle valves, such as they are used for the control of cooling flows in air conditioning systems of automotive vehicles. Herein, the relative position of the needle with respect to a recess is controlled in such a manner that the opening effectively available for a gas or refrigerating fluid flow is regulated.

Precisely in such applications, however, the arising vibrations and the substantially varying temperatures in combination with the sometimes different coefficients of thermal expansion of the mechanical valve components can over time lead to deviations of the needle position for a predetermined opening aperture of the valve. Control errors resulting therefrom can also lead to faster wear of the mechanical components. At the same time, the possibilities for recalibration during operation are often limited.

The approaches known from the prior art of recalibrating on a mechanical end stop or the introduction of position sensors either lead to higher wear rates of the actuator or involve higher costs.

It is the object to provide an optimized actuator, which allows positioning that is as constant and precise as possible over the service life of an associated apparatus without interrupting the operation of the apparatus for calibrating steps.

OVERVIEW

According to a first aspect, there is provided a method for controlling an actuator comprising an electric motor and an actuating element coupled to the electric motor. The method comprises controlling the electric motor to move the actuating element in a direction towards an absolute mechanical end stop until a last registered soft reference position has been reached and then to overtravel the last registered soft reference position by a predetermined distance. The method also comprises detecting the load of the actuator and updating the registered soft reference position on the basis of the detected load.

The soft reference position refers to a reference position of the actuator at which a change in the mechanical resistance of the actuator occurs. The soft reference position can be detected by detecting a load step and can be approached. The soft reference position does not correspond to the absolute mechanical end stop of the actuator.

The load step is a mechanical resistance arising through the mechanical configuration of the actuating system in a certain position, which leads to a load jump in the actuator when it is approached or overtravelled. For example, due to the mechanical configuration of the actuating system the torque necessary for moving the actuating element can vary along the actuating distance of the actuating system, wherein the exceeding of a necessary torque threshold value can be defined as a load step.

The load step can arise or be produced in an actuator by a frictional resistance dependent on the travel of the actuator or by the work to be performed. For example, an additional movement resistance can be produced in the actuator with spring elements or can arise at the position of a mechanical engagement between elements of the actuator.

By detecting the load or the torque of the electric motor, this load step can be detected in the actuator when the load step is approached or overtravelled and thus the last registered soft reference position can be updated.

Overtravelling the soft reference position can serve to regularly and securely detect a load change arising at the soft reference position. Consequently, the registered soft reference position can be regularly updated. In comparison to approaching an absolute mechanical end stop of the actuator, which can be an absolute calibrating position for the actuator, there is less wear when the soft reference position is overtravelled. In contrast to the system approaching the mechanical end stop, it is not, or not substantially, stressed.

The updating can be performed in the current operation without explicit calibrating steps being necessary. The soft reference position is preferably chosen in such a way that it is frequently approached or that the relative position is of particular importance with respect to the technical application. For example, for a needle valve, a closed position of the needle valve can be chosen as a soft reference position.

In some examples, the method is therefore used for controlling a linear actuator, and the actuating element comprises a linearly movable shaft or a linearly movable needle.

In some examples, the soft reference position is a soft end stop position, wherein the soft end stop position is a reference position close to the actual mechanical end stop.

The soft end stop position can be associated with a position of the actuator, at which the linearly movable shaft or the linearly movable needle touches a limitation of the adjustment travel positioned outside of the actuator. Such a soft end stop position can be produced in the present case, for example, in the actuator by elastically supporting the needle or parts of the actuating system that are connected to the needle. As a consequence, the limitation of the actuation travel can be overtravelled by the actuator and the force effect of the elastic support can be used for generating the load step of the soft reference position.

In some examples, the soft reference position is regularly updated on the basis of a control command in the operation of the actuator, which provides approaching of the closed position of the actuator or follows approaching of the closed position of the actuator.

In some examples, the registered soft reference position is updated when a load increase or a load decrease is detected in the electric motor.

In some examples, the last registered soft reference position is updated when a load increase is detected in the electric motor. A load increase may be easier to detect than a load decrease. In other examples it can be provided, however, that the soft reference position is updated in dependence on the detection of a load decrease.

In some examples, the actuator comprises a load step, wherein the load step generates a load increase in an opening direction of the actuator away from the absolute mechanical end stop.

The load increase in the opening direction can be generated by an increased resistance against the travel of the actuator in a section of the travel of the actuator.

In some examples, the method further comprises controlling the electric motor to move the actuating element away from the absolute mechanical end stop after the last registered soft reference position was overtravelled by a predetermined distance, and further comprises updating the registered soft reference position when a load increase or a load decrease is detected in the electric motor during the movement away from the absolute mechanical end stop.

When the soft reference position is chosen to be near the absolute mechanical end stop both approaching and remaining at the soft reference position can be frequently provided. After a prolonged remain time after overtravelling the soft reference position a thermal adjustment of the mechanics of the actuator can be automatically considered during the remain time by updating the last registered soft reference position during the actuating movement away from the absolute mechanical end stop.

In some examples, the load is detected on the basis of the motor current of the electric motor.

By measuring the motor current and, as the case may be, further electric parameters, direct measuring of the torque can be performed. A load jump occurring at the soft reference position can thus be detected on the basis of the behavior of the motor current during the movement of the actuating element. The load jump can be provided, in principle, both by a load increase and also by a load decrease.

In some examples, the detection of the load of the actuator comprises determining a predetermined angular position of the electric motor, determining a detected angular position of the electric motor, controlling the electric motor to move the actuating element with a first, low torque, and detecting a first load jump by comparing the detected angular position with the predetermined angular position of the electric motor.

The first, low torque is preferably lower than a load step associated with the soft reference position. A load jump can thus be detected when the predetermined angular position and the detected angular position at the load step diverge due to an increased resistance against the movement of the electric motor. A load step detected due to the increased resistance against the travel of the electric motor can allow higher precision in the determination of the soft reference position than a direct load measurement on the basis of the motor current.

In some examples, the predetermined angular position is detected on the basis of the motor current of the electric motor, for example, on the basis of a current distribution between different phases of the motor current of the electric motor. The load jump can also be identified in some examples on the basis of the current distribution detected between different phases of the motor current of the electric motor. For example, the detected current through the motor phases can be compared with a current to be expected without a load jump. In particular, an expected range of the motor current can be defined, and when the expected value is exceeded or remained short of, a load jump can be detected.

In some examples, the determination of the detected angular position is performed on the basis of measuring data of a Hall sensor. The angular position can also be detected, however, by means of other types of sensor, for example, by means of a capacitive sensor.

In some examples, the method also comprises calibrating the actuator. The calibration comprises controlling the electric motor to move the actuating element with a second predetermined torque in the direction towards the absolute mechanical end stop until a second load jump is detected in the electric motor, and controlling the electric motor to move the actuator with a third, higher torque away from the absolute mechanical end stop to detach the actuating element from the absolute mechanical end stop and to remove it by a predetermined distance. The method also comprises controlling the electric motor to move the actuator away from the absolute mechanical end stop with the fourth, low torque, until a third load jump is detected in the electric motor, and registering the position of the actuating element at the third load jump as a soft reference position; wherein a closing movement is in the direction towards the mechanical end stop and an opening movement is in the opposite direction.

After resuming operation or after a reset of the actuator, for example, in the context of an end-of-line or service process, the position of the actuator can be indeterminate. Therefore, for calibration purposes, the absolute mechanical end stop can be approached and the load jump associated with the absolute mechanical end stop can be detected for determining an absolute actuator position. To avoid mechanical locking of the actuator, the third, higher torque is provided and the actuator is detached from the absolute mechanical end stop.

To determine the initially indeterminate soft reference position, then the fourth torque is provided, which should be chosen such that the actuator is moved between the absolute mechanical end stop and the soft reference position, overtravelling of the soft reference position starting from the mechanical end stop through the load step, which is associated with the soft reference position, can be prevented, however. This helps to ensure safe detection of the soft reference position even when the distance between the absolute end stop and the soft reference position is not known. Thereafter, in the normal operation, approaching of the absolute mechanical end stop can be omitted and, for example, only the soft reference position can be approached and updated. Preferably, the fourth predetermined torque is therefore chosen such that the load step leads to a locking of the electric motor. Furthermore, in some examples of the method it is provided that the first load step is detected in an analogous fashion by detecting a locking condition of the electric motor.

In some examples, calibration further comprises controlling the electric motor to move the actuating element away from the absolute mechanical end stop with a fifth torque over a first predetermined distance, verifying the movement of the actuating element on the basis of the load of the actuator, and controlling the electric motor to move the actuating element, with a sixth torque, in the direction towards the absolute mechanical end stop over a second, larger predetermined distance.

The fifth torque is preferably chosen such that, in the normal operation of the actuator, the actuating element is moved. By the additional verification steps, therefore, mechanical locking of the travel erroneously identified as a soft reference position, can be detected. After the provision of the sixth torque over the second predetermined distance, the actuator is in a position from which the soft reference position is updated when an opening movement is provided.

In some examples, the predetermined distance is provided via a predetermined number of commutating steps of the electric motor.

A further aspect provides an actuator. The actuator comprises an electric motor and an actuating element coupled to the electric motor, wherein the actuator is configured to control the electric motor to move the actuating element in a direction towards an absolute mechanical end stop until a last registered soft reference position has been reached and then to overtravel the last registered soft reference position by a predetermined distance, to detect the load of the actuator, and to update the registered soft reference position on the basis of the detected load.

In some examples, the actuator is configured to implement the method according to the first aspect or the examples of the first aspect to control the actuator.

In some examples, a load step along the travel of the actuator is associated with the soft reference position.

In some examples, the registered soft reference position is updated on the basis of a load increase or a load decrease when overtravelling the soft reference position.

In some examples, the actuator is configured to overtravel the last registered soft reference position by a predetermined distance at least regularly whenever a closed position of the actuating system is provided.

In some examples, the actuator is configured, for calibration, to provide a second torque in a closing direction in a direction towards the absolute mechanical end stop of the actuator until the second load jump is detected in the electric motor, to provide a third, higher torque in an opening direction opposed to the closing direction to detach the actuator from the absolute mechanical end stop and to remove it by a predetermined distance, to provide a fourth, low torque in the opening direction until a third load jump is detected in the electric motor, and to register the position of the actuator at the third load jump as a soft reference point.

In some examples, the actuator is configured, after calibration, to provide a fifth torque in the opening direction for a predetermined distance, to verify a rotation of the rotor, and to provide a sixth torque in the closing direction for a second, larger predetermined distance.

In some examples, the actuator is a linear actuator and the actuating element comprises a linearly movable shaft.

In some examples, the linearly movable shaft comprises a thread engaging a thread of the nut, connected to the rotor of the electric motor in a torque-proof manner, so that a rotary movement of the rotor leads to a linear displacement between the shaft and the nut.

In some examples, a rotary movement of the shaft is prevented by an interlocking engagement between the shaft and the housing of the linear actuator.

In some examples, the linear actuator comprises an elastic element, which biases the linearly movable shaft in the direction towards the absolute mechanical end stop, wherein the nut is supported to be linearly movable in the linear actuator and rests on a support surface of the linear actuator opposite the elastic element so that when the linear actuator overtravels the soft reference position the nut performs a linear movement in the linear actuator.

By the possibility of having the nut perform the linear movement in the linear actuator without simultaneously loading the thread with the return force of the elastic element, a load step can be produced in the linear actuator at a stop of the actuating element at an external limitation. The load step produces a load increase in the opening direction of the actuator. The elastic element can be a spring element.

In some examples, the support surface is the top surface of a ball bearing of the linear actuator.

DETAILED DESCRIPTION OF EXAMPLES

The disclosure will be described in the following in more detail with reference to different examples with reference to the enclosed drawings, in which:

FIG. 8 shows a behavior of the motor current during calibration of an actuator as a function of time according to an example.

Figure 1:
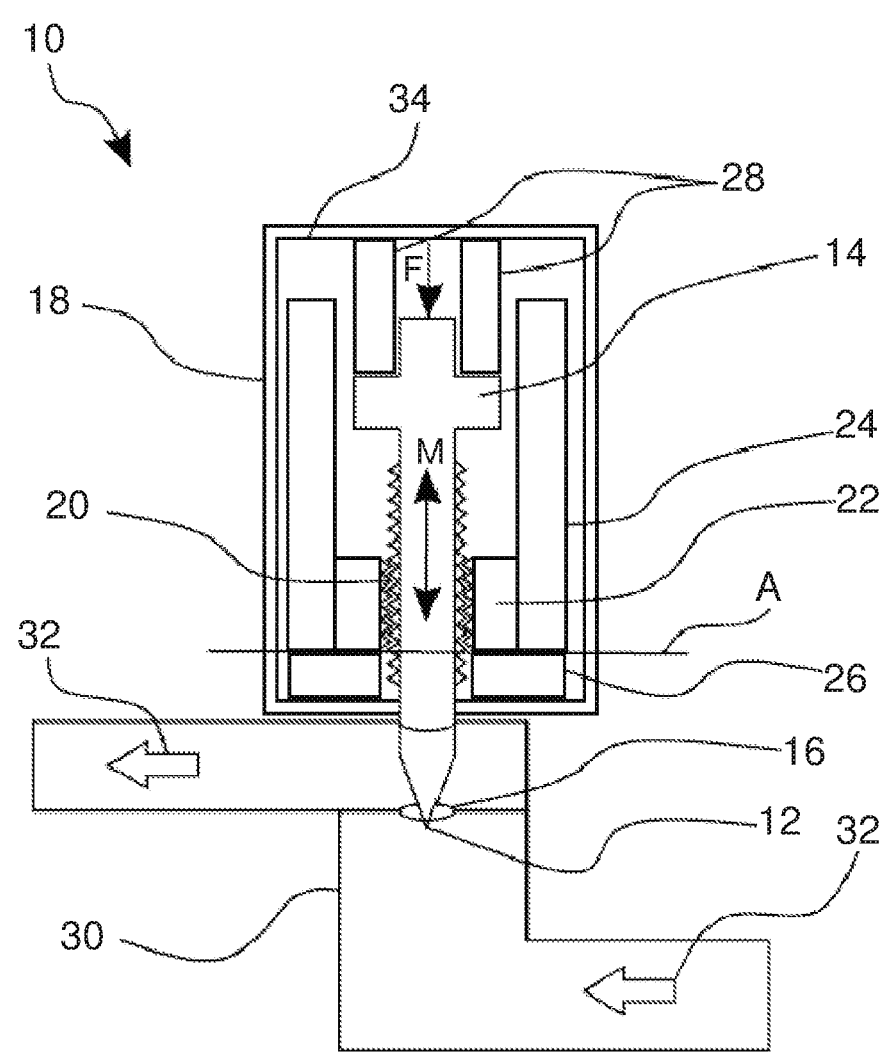
FIG. 1 shows a schematic linear actuator for providing a needle valve according to one example.

FIG. 1 shows an example of a linear actuator 10 in a valve application which controls the relative position of a needle 12 of an actuating element 14 with respect to a recess 16. The actuator 10 comprises the actuating element 14, which is arranged in a housing 18 and is coupled with a nut 22 via a thread 20. The nut 22 is connected to the rotor 24 of an electric motor (only the internally arranged rotor is shown) in a torque-proof manner and rests on a support surface A of a ball bearing 26. An elastic element 28, for example a spring, biases the actuating element 14 in a direction towards the recess 16.

The thread 20 acts to transmit a return force F of the elastic element 28 from the actuating element 14 to the nut 22 so that the actuating element 14, in normal operation, is supported on the support surface A via the thread 20 and the nut 22. A rotary motion of the actuating element 14 can be prevented by an interlocking engagement of the protrusion of the actuating element 14 with the housing 18.

By rotating the rotor 24 a rotary motion can be transformed via the thread 20 to a linear displacement movement M between the actuating element 14 and the nut 22. The linear displacement movement M can let the needle 12 plunge into the recess 16, or can withdraw the needle 12 from the recess 16.

Through a conduit 30, a cooling flow 32 can flow, the flow of which can be controlled via the valve consisting of the needle 12 and the recess 16.

When the needle 12 transitions from an at least partially opened valve position to a closed valve position so that the needle 12 closes off the recess 16, the return force F of the elastic element 28 can act directly on the recess 16 via the actuating element 14. In this way, actuating element 14, in the closed valve position, is no longer supported by the thread 20 and the valve 22 on the support surface A.

Consequently, in the closed valve position, a force of the elastic element 28 is no longer transmitted to the nut 22 via the thread 20. Departing from this closed valve position, a further rotary movement of the rotor 24 can lead to a linear displacement movement of the rotor 24 within the housing 18 of the actuator 10 away from the recess 16. The rotor 24 can be displaced within the housing 18 up to an absolute mechanical end stop 34 on an inner sidewall of the housing 18 of the actuator 10. The travel of the actuator 10 is thus not limited by the contacting position between the needle 12 and the recess 16 in the closed valve position. Instead, departing from this contacting position, the rotor 24 lifts off from the support surface A, and a movement, in the example shown, is only between the rotor 24 and the housing 18. The absolute mechanical end stop 34 is thus not provided, as is usually the case, by the limitation of the travel of the actuating element 14 but is defined by the stop of the freely rotating rotor 24 within the housing 18 on the inner sidewall of the housing.

The travelling direction of the rotor 24 up to the absolute mechanical end stop 34 will be referred to in the following as a closing direction, while the travelling direction away from the absolute mechanical end stop 34 will be referred to as an opening direction.

Figure 2:
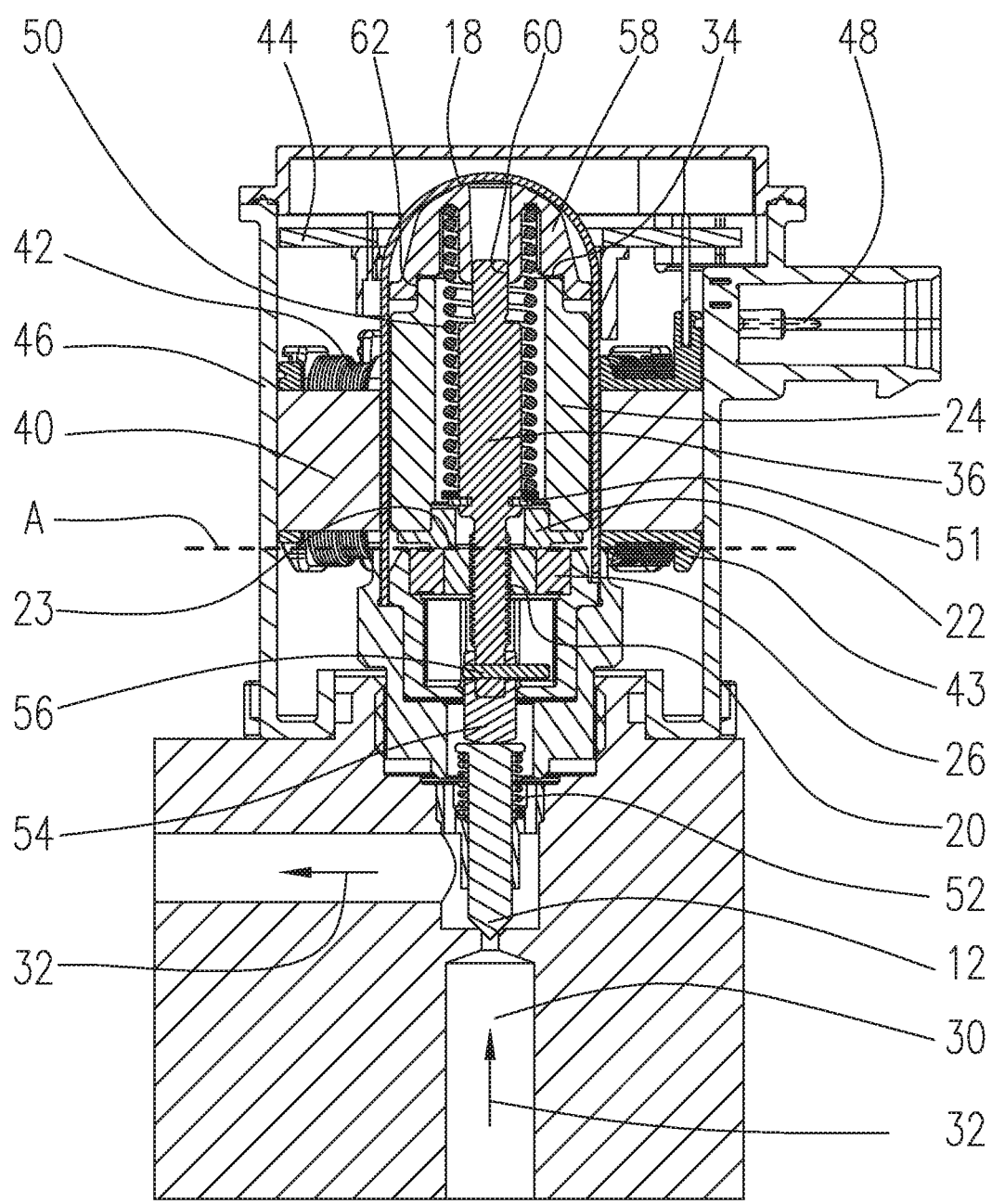
FIG. 2 shows an example of the linear actuator of FIG. 1.

FIG. 2 shows an example of a needle valve corresponding to the schematic representation of FIG. 2. In FIG. 2, a stator 40 of the electric motor with a stator winding 42 is additionally shown. The stator 40 is coaxially arranged with respect to the rotor 24. A slot insulation 43 is installed between the stator core and the stator winding 42. The stator 40, together with a printed circuit board 44, is arranged in an outer housing 46. The printed circuit board 44 can comprise, in particular, a motor control for controlling the electric motor. The printed circuit board 44 can be electrically contacted from the outside via ports 48 arranged on the outer housing 46.

In the present case the elastic element 28 acting on the rotor is formed as a spring 50. The spring 50 rests on a ring 51 supported by the threaded rod 36 so that a force acts on the threaded rod 36 in the axial direction thus producing a biasing force between a thread 20 of the threaded rod 36 and a thread of the nut 22. The threaded rod 36 is secured by means of a pin 56 against rotational movement and connected to an intermediate part 54. The intermediate part 54 further couples the threaded rod 36 with the needle 12. A second spring 52 is mounted on the needle 12, causing a spring force in the opening direction of the needle 12. When the valve is closed, the spring force of the spring 50 is applied to the needle 12 via the intermediate part 54 and is no longer transmitted to the nut 22. In the same manner, the spring force of the second spring 52 is not applied to the nut 22. As a consequence, the nut 22 is free to move on the thread of the threaded rod 36 so that the rotor 24 is lifted as soon as the electric motor is driven in the closing direction beyond the closing position of the valve. When the valve is fully closed while the electric motor moves further in the closing direction, the nut 22 is thus lifted together with the rotor 24 limiting the resulting movement of the threaded rod 36 in the axial direction by the end stop 34. In the same way, the nut 22 can be moved away from the absolute mechanical end stop 34 up to the closing position of the valve without having to work against the spring force of the second spring 52.

However, if the valve is operated in the normal travelling range between an open and a closed position, the nut 22 rests on a support surface 23. As a consequence, the rotary movement of the rotor, in the normal travelling range, causes an axial movement of the threaded rod 36 and the needle 12 so that the valve opens or closes.

A molded part 58 is further arranged on an inside of the housing 18. In the example shown, the molded part 58 provides the absolute mechanical end stop 34 for the axial movement of the rotor 24 in the closing direction. Furthermore, the molded part 58 provides a plain bearing 60 for axial guiding of the threaded rod 36. Moreover, the molded part 58, in the present examples, also provides a further plain bearing 62 for guiding and radially aligning the rotor 24 carrying the rotor magnet.

Figure 3:
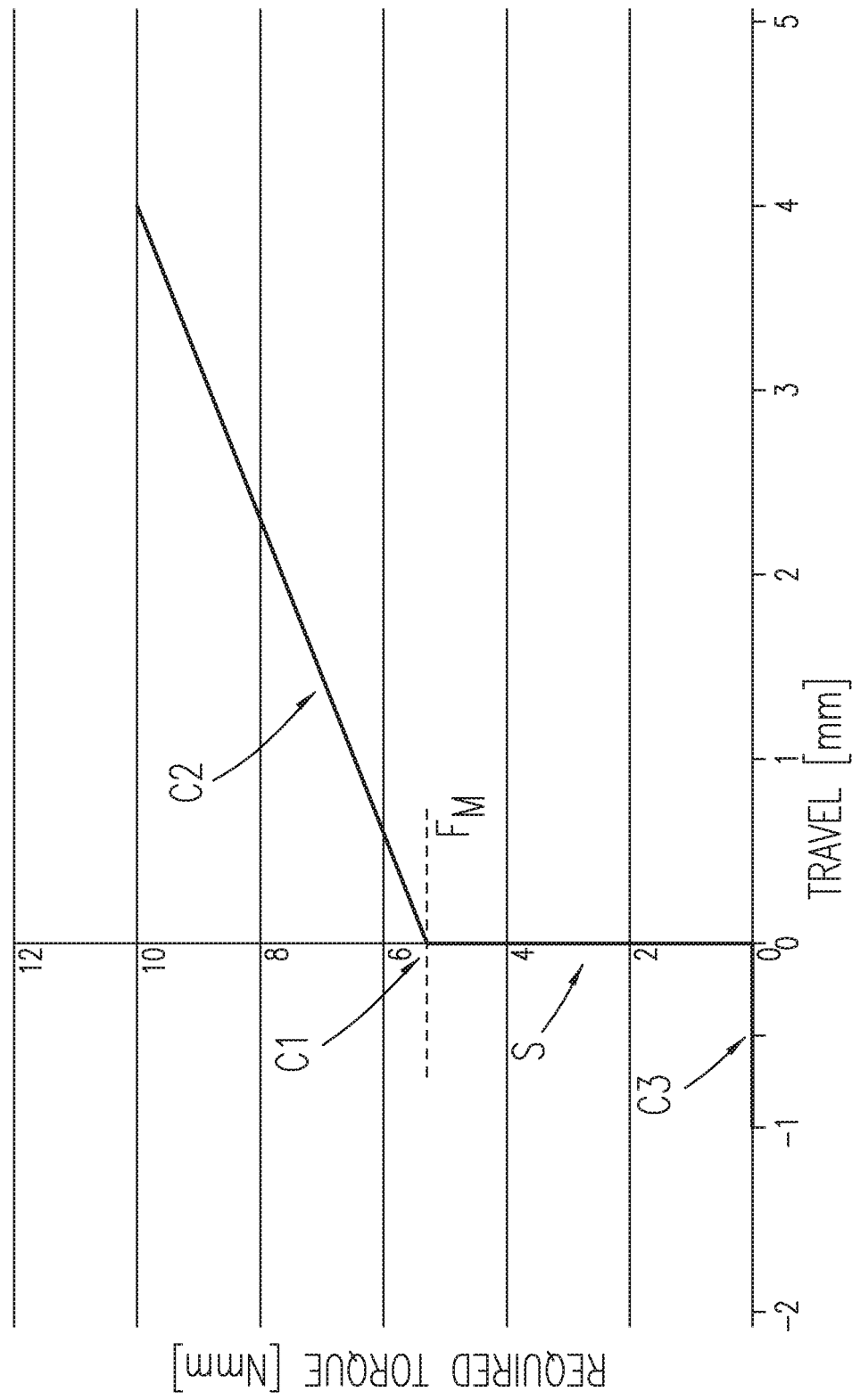
FIG. 3 shows a behavior of the torque required for moving an actuating element as a function of the travel according to an example.

A graphical representation of the torque needed for producing a relative displacement movement in the actuator 10 between the nut 22 and the actuating element 14 of FIGS. 1 and 2 is shown in FIG. 3 as a function of the travel of the actuator 10. Three different operating ranges $C_1$, $C_2$, $C_3$ of the actuator 10 can be associated with the torque profile along the travel.

The operating range $C_2$ comprises positive values of the travel corresponding to a relative movement between the recess 16 and the actuating element 14 in an at least partially opened position of the valve. In the at least partially opened position of the valve the needle 12 has been withdrawn from the recess 16 and a cooling flow 32 can flow through the conduit 30. Since in the at least partially opened position of the valve the return force of the elastic element 28 acts on the thread 20, the torque required for displacing the actuating element 14 in both directions is increased due to the frictional forces arising in the thread 20.

As the values get more positive, the return force of the elastic element 28 can increase and can thus influence the friction to be overcome and the work to be done. In the example of FIG. 3, a linear relationship between the return force of the elastic element 28 and the travel, results in a similar linear relationship between the torque required and the displacement of the actuating element 14.

Negative values of the travel correspond to an operating range $C_3$ in which the actuating element 14 has been inserted in the recess 16 and is supported on the recess 16 and the cooling flow 32 through the conduit 30 is blocked by the needle 12 in the recess 16. In the operating range $C_3$, continuing the rotation of the rotor 24 in the closing direction causes a linear movement of the rotor 24 in the housing 18 in the direction towards the absolute mechanical end stop 34. The rotor is thus, as it were, lifted off. Since the return force of the elastic element 28, in the operating range $C_3$, is received by the recess 16, and thus no longer acts on the thread 20, the torque required for displacing the rotor 24 is very low.

The point 0 mm on the travel corresponds to the closed valve position $C_1$, in which the needle 12 just touches the recess 16.

At the transition from negative to positive values of the travel, between the operating range $C_2$ and the operating range $C_3$, the rotor 24 rests on the support surface A and, by the engagement of the thread, a rotary motion of the rotor 24 can be transmitted to the actuating element 14. The frictional forces produced by the elastic element 28 in the thread 20 at the closed valve position $C_1$ occur abruptly so that the required torque rises substantially. The increase of the required torque corresponds to a load jump S having a magnitude of a torque threshold value $F_M$.

Departing from the closed valve position $C_1$, the actuating element 14 can be displaced by a predetermined distance in the positive direction to create any desired opening aperture of the valve. The operating range $C_2$ will be referred to in the following as an at least partially opened valve position $C_2$, and the operating range $C_3$ will be referred to in the following as the overtravelled valve position $C_3$.

In the operation of the valve the position of the closed valve position $C_1$ along the travel can change as a consequence of mechanical wear, thermal expansion or mechanical stresses on the components of the actuator 10.

The transition between the essentially force-free movement of the rotor 24 and the closing movement in the positive direction at which the load jump occurs can be used to determine a soft reference position. In the present example, the soft reference position represents the just-closed valve position $C_1$ and can thus be used for adjusting a predetermined opening position of the valve departing from the closed valve position $C_1$.

In other mechanical systems, a soft reference or a soft end stop can be determined by utilizing a load jump S which can be derived on the basis of other configurations or by introducing an additional mechanical resistance.

Figure 4:
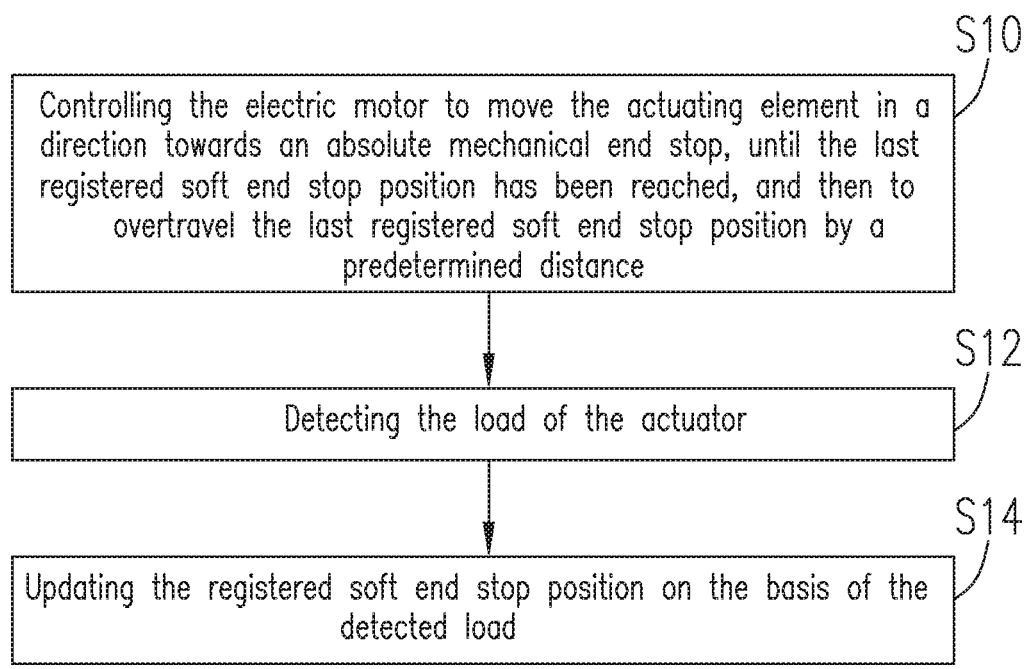
FIG. 4 shows a method for controlling an actuator according to an example.

For detecting or updating the soft reference position, a method is used as it is shown, for example, in FIG. 4. The method comprises controlling the electric motor to move the actuating element 14 in a direction towards an absolute mechanical end stop 34 until a last registered soft reference position has been reached, and then to overtravel (S10) the last registered soft reference position by a predetermined distance, detecting the load of the actuator (S12), and updating the registered soft reference position on the basis of the detected load (S14).

In the exemplary linear actuator 10 of FIGS. 1 and 2, the soft reference position corresponds to the just-closed valve position $C_1$, in which the needle 12 just touches the recess 16. The load jump S which occurs at the just closed valve position $C_1$, when the closed valve position $C_1$ is approached or overtravelled in the opening direction, produces a load increase, which can be detected by the actuator 10. The position of the actuating element 14 occurring at the load jump S can be detected and the last registered soft reference position can be updated on the basis of the detected position.

The load jump S can be detected by detecting the torque of the electric motor required for the relative displacement between the nut 22 and the actuating element 14. For example, when the voltage remains the same, an increase or a decrease in the motor current of the electric motor can be detected for determining the torque. The motor current being changed or a predetermined current threshold value being exceeded, can then be associated with the load jump S, and the last registered soft reference position can be updated correspondingly.

Figure 5:
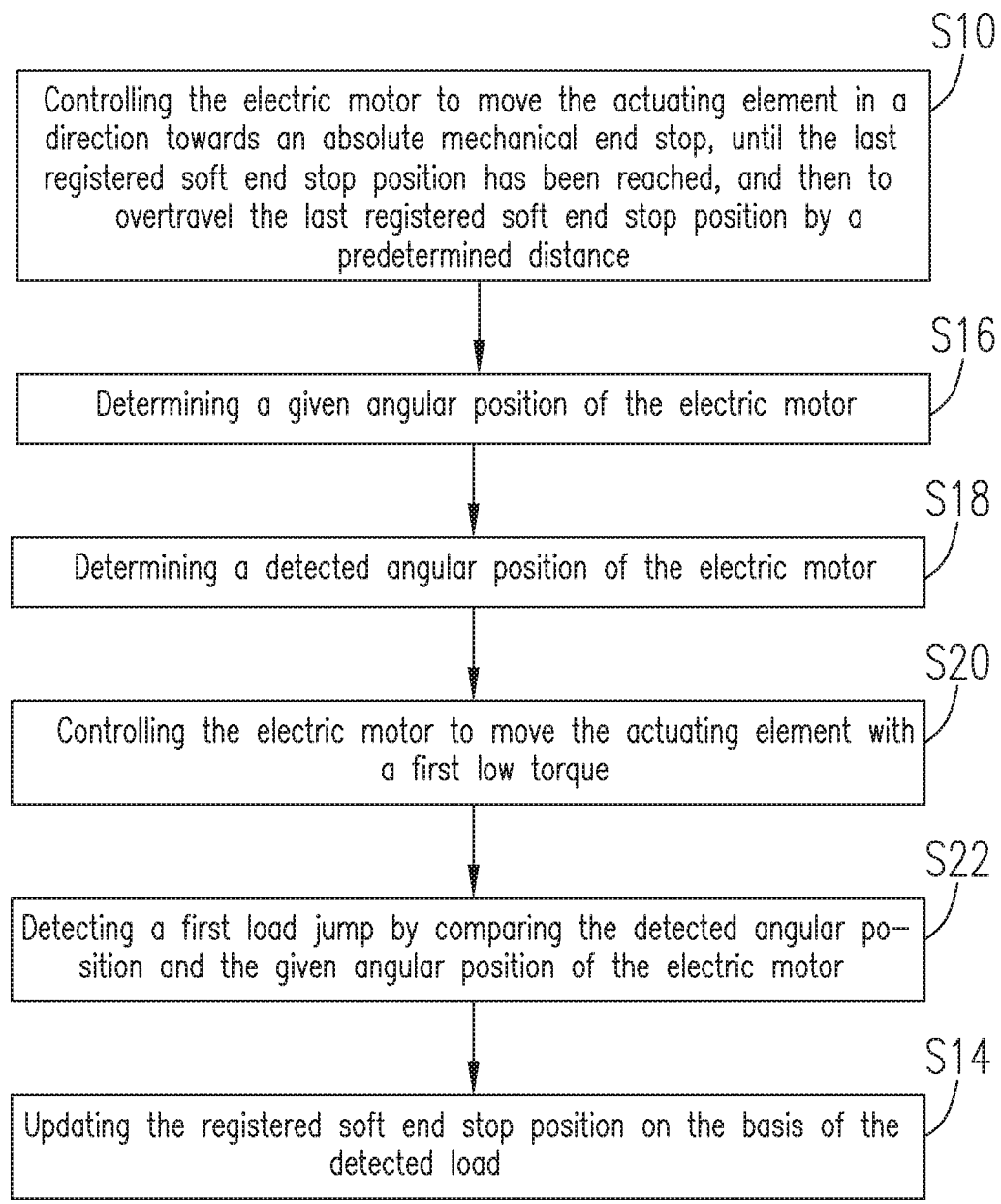
FIG. 5 shows a further method for controlling an actuator according to an example.

A further method for detecting a load increase on the basis of an indirect load measurement is shown in FIG. 5. The method comprises controlling the electric motor to move the actuating element 14 in the direction towards an absolute mechanical end stop 34 until a last registered soft reference position has been reached, and then to overtravel the last registered soft reference position by a predetermined distance (S10). To detect the load, the method further comprises determining a predetermined angular position of the electric motor (S16), determining a detected angular position of the electric motor (S18) and controlling the electric motor to move the actuator 14 with a first, low torque (S20). The method further comprises detecting a first load jump S by comparing the detected angular position with the predetermined angular position of the electric motor (S22) and updating the registered soft reference position on the basis of the detected load (S14).

The predetermined angular position can be determined, for example, on the basis of the current distribution between different phases of the electric motor.

The detected angular position or the actual angular position of the electric motor can be determined with the aid of a sensor, such as a Hall sensor. For example, the angular position can be detected with the aid of three Hall sensors.

If a difference is determined between the predetermined angular position and the detected angular position, it can be concluded that there is a resistance in the travel of the electric motor, a so-called "stall".

To have the load jump S at the closed valve position $C_1$ coincide with a resistance in the travel of the electric motor, the first, low torque of the electric motor can be chosen such that the predetermined first torque is smaller than the torque threshold value $F_M$ for overtravelling the load jump S.

If then a resistance in the travel of the electric motor is detected on the basis of the comparison of the predetermined and detected angular positions, the detected angular position at which the resistance in the travel of the electric motor was determined can be associated with the load jump S of the actuator 10.

Figure 6:
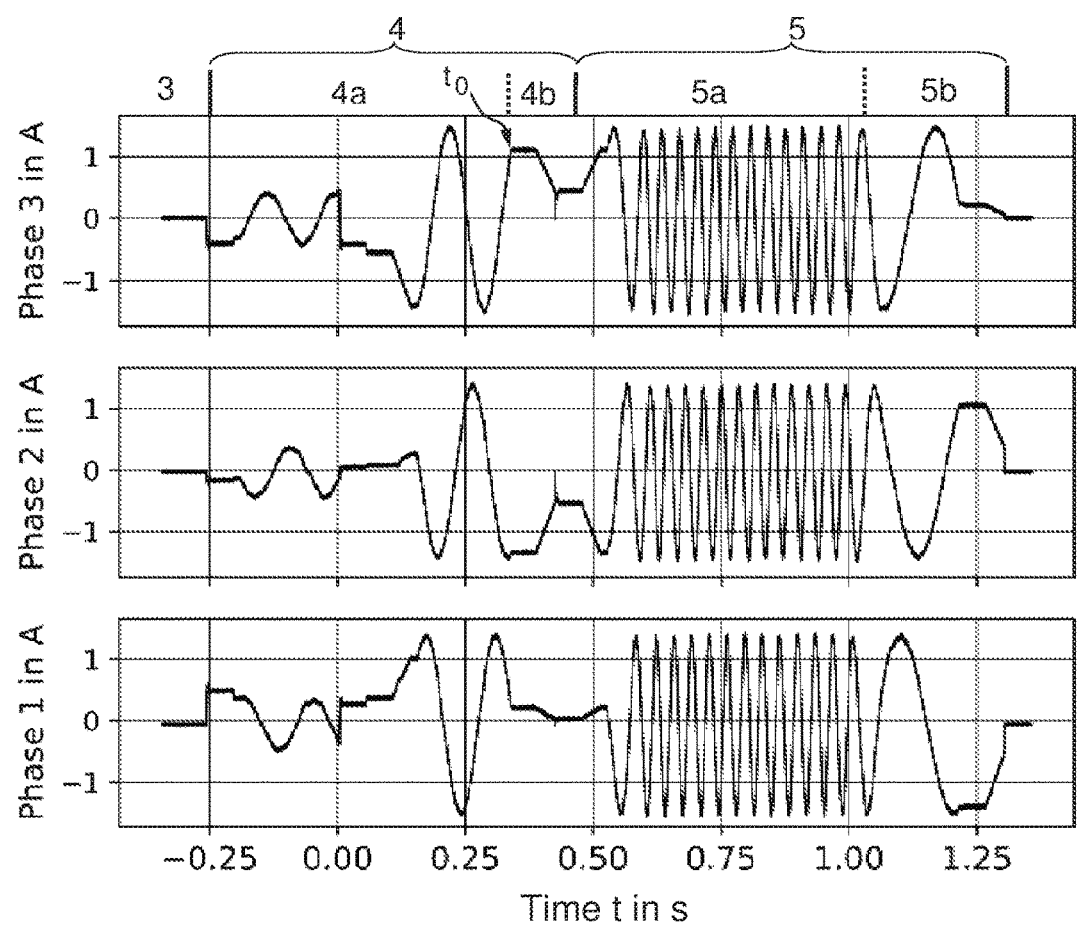
FIG. 6 shows a behavior of the motor current of an actuator as a function of time during updating of the soft reference position according to an example.

A behavior of the currents of an electric motor as a function of time in the context of updating the soft reference position in accordance with the method graphically shown in FIG. 5 is shown in FIG. 6 for an exemplary actuator 10. The behavior can be basically subdivided into five time sections. In a first time section (1), starting from any position, the closing of the valve is provided. The actuator 10 is then set up to thereafter move the actuating element 14 to the last registered soft reference position and to overtravel the latter by a predetermined distance up to a pause position. The overtravelling of the soft reference position is carried out in the second time section (2). In the third time section (3) the actuator 10 remains in the pause position. The sections 1 and 2 are not shown in FIG. 6. Of section (3) only the end of the section is indicated.

At the beginning of the fourth time section (4), an opening degree of the valve is predetermined. The actuator 10 then controls the electric motor to move the actuating element 14 with the first, low torque, corresponding to an opening movement, away from the absolute mechanical end stop. At time $t_0$, a load jump S is detected by the actuator 10. It is thereby identified that the rotor 24 rests on the support surface A and the closed valve position $C_1$ has been reached. The registered soft reference position is then updated so that it corresponds to the position of the actuator 10 at the load jump S. In the present example, the fourth time section comprises a first subsection (4a) in which the opening movement is performed, as well as an optional subsection (4b) which comprises a short holding phase. In the holding phase (4b), the electric motor is energized with a holding current so that the actuator remains in the soft reference position for a short time. During the holding phase (4b), for example, two phase windings of a three-phase electric motor can be constantly energized. In the time section (5), a second, higher torque is provided to overtravel the soft reference position and to remove the actuating element 14 from the soft reference position by a predetermined distance to create the predetermined opening degree of the valve. The time section (5) is subdivided into two subsections, in the present example, wherein a first subsection (5a) comprises the actuating movement, and a second subsection (5b) represents a braking process during which the speed of the electric motor is reduced until it comes to a complete stop.

After a reset, or when first operating the actuator 10, for example in the context of an end-of-line process, the soft reference position may be indeterminate. In such a case, a calibration of the actuator 10 may be first performed. Such a method is schematically shown in FIG. 7.

Figure 7:
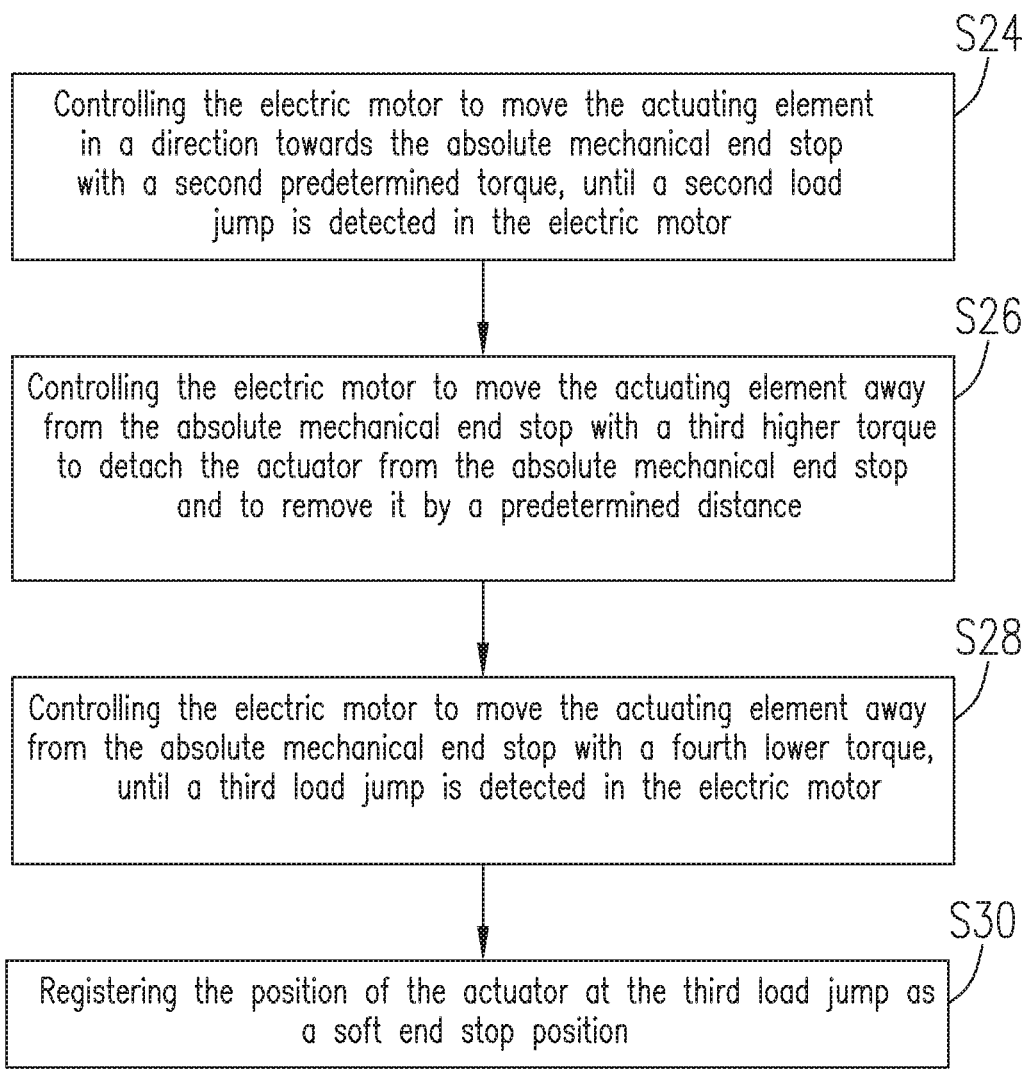
FIG. 7 shows a method for calibrating an actuator according to an example.

The method of FIG. 7 comprises controlling the electric motor to move the actuating element 14 with a second predetermined torque in the direction towards the absolute mechanical end stop 34 until a second load jump is detected in the electric motor (S24), controlling the electric motor to move the actuating element 14 with a third, higher torque away from the absolute mechanical end stop 34 to detach the actuator 10 from the absolute mechanical end stop 34 and to remove it by a predetermined distance (S26), controlling the electric motor to move the actuating element 14 away from the absolute mechanical end stop with a fourth, low torque until a third load jump is detected in the electric motor (S28) and registering the position of the actuator 10 at the third load jump as a soft reference position (S30).

In the above-shown example of a linear actuator 10 in a valve application the second load jump can be associated with reaching the absolute mechanical end stop 34 at the inner sidewall of the housing 18. To detach the actuator 10 from the absolute mechanical end stop 34 the third torque can be higher than the second torque. The third, higher torque is provided over a predetermined distance that is small compared to the expected distance between the absolute mechanical end stop 34 and the soft reference position.

Subsequently, the fourth, low torque is provided, which can correspond to the first torque for updating the last registered soft reference position. The third load jump can thus be associated with the soft reference position in a manner similar to the first load jump S, and the soft reference position can be registered during calibration.

FIG. 8 shows a corresponding current behavior of the motor currents of the electric motor of an exemplary actuator 10 during calibration, which is subdivided into five time sections. In a first time section (1), approaching of the absolute mechanical end stop of the actuator 10 is provided in the closing direction. The actuator 10 is set up to then move the actuating element 14 with the second predetermined torque until the second load jump is detected. The second load jump is detected at time $t_1$. This corresponds to a locking of the movement of the rotor 24 at the absolute mechanical end stop 34 in the actuator 10 of FIG. 1.

In the second time section (2), the third, higher torque is provided for a certain distance in the opening direction so that the actuating element 14 is detached from the absolute mechanical end stop 34. To detect the soft reference position, subsequently, in the third time section (3) the fourth, low torque is provided in the opening direction, which is smaller than the torque $F_M$ necessary for overtravelling the load jump S. At time $t_2$, a third load jump is detected in the actuator 10. This corresponds to the closed valve position $C_1$ at which the rotor 24 rests on the support surface A and the return force of the elastic element 28 acts on the thread 20. The position at which the third load jump was detected is registered as a soft reference position in the actuator 10.

Subsequently, a mobility of the actuating element 14 is checked. To do this, in the fourth time section (4) the fifth torque is provided in the opening direction to overtravel the soft reference position, and then, in the fifth time section (5) the sixth torque is provided in the opposite, closing direction to move the actuating element 14 into the pause position. This corresponds to an overtravelled valve position $C_3$ in the vicinity of the soft reference position, in which the rotor 24 is detached from the support surface A by a little distance.

Thereafter, a predetermined opening degree of the actuator 10 with respect to the soft reference position can be approached, wherein when the soft reference position is overtravelled in the opening direction, the last registered soft reference position can be updated.

The electric motor is preferably synchronously controlled, wherein the commutating times are fixedly provided by the motor control. Alternatively, it may be that the electric motor is controlled in a sensor-less manner. In such embodiments, for determining the rotor position, or the rotational speed of the electric motor, the voltage induced in the phase windings due to the rotary motion of the rotor, the so-called back electromotive force (BEMF) can be detected. The BEMF can be detected, for example, with the aid of zero-crossing detection by means of voltage comparators. Alternatively or additionally, the rotational speed can be determined on the basis of the motor current.

The electric motor can be controlled, in particular, with a so-called block commutation. Herein, the phase windings are energized with the full voltage amplitude while a pulse width modulation (PWM) can be superimposed. Alternatively, a so-called sinusoidal commutation can be provided, wherein the voltage amplitude is modulated on a sinus curve. PWM may also be superimposed on the sinusoidal commutation.

The above description of the examples, examples and drawings is only intended to illustrate the invention and the attendant advantages and is not to be construed as limiting the scope of protection. Rather, the scope of protection of the invention is to be determined from the enclosed claims.

LIST OF REFERENCE NUMERALS

10 actuator
12 needle
14 actuating element
16 recess
18 housing
20 thread
22 nut
23 supporting surface
24 rotor
26 ball bearing
28 elastic element
30 conduit
32 cooling flow
34 absolute mechanical end stop
36 threaded rod
40 stator
42 stator winding
43 slot insulation
44 printed circuit board
46 outer housing
48 ports
50 spring
51 ring
52 spring
54 intermediate part
56 pin
58 molded part
60 plain bearing
62 plain bearing
M direction of travel
F return force
A supporting surface
S load jump
FM torque threshold value
C1 closed valve position
C2 at least partially opened valve position
C3 overtravelled valve position
t0 time of detecting the first load jump
t1 time of detecting the second load jump
t2 time of detecting the third load jump

The invention claimed is:
1. A method of controlling an actuator comprising an electric motor and an actuating element coupled to the electric motor via a printed circuit board that includes a motor control, the method comprising:

controlling, via the motor control, the electric motor to move the actuating element in a direction towards an absolute mechanical end stop until a last registered soft reference position has been reached and then to overtravel the last registered soft reference position by a predetermined distance, detecting, via the motor control, a load of the actuator, updating, via the motor control, the registered soft reference position based on the detected load; and wherein the registered soft reference position is updated via the motor control when a load increase or load decrease is detected in the electric motor.

2. The method according to claim 1, the method further comprising:

after the last registered soft reference position has been overtravelled by a predetermined distance, controlling, by the motor control, the electric motor to move the actuating element away from the absolute mechanical end stop, and during the movement away from the absolute mechanical end stop, updating, by the motor control, the registered soft reference position when a load increase or load decrease is detected in the electric motor.

3. The method according to claim 1, further comprising:

determining, by the motor control, a predetermined angular position of the electric motor, determining, by the motor control, a detected angular position of the electric motor, controlling, by the motor control, the electric motor to move the actuating element with a first, low torque, detecting, by the motor control, a first load jump by comparing the detected angular position with the predetermined angular position of the electric motor.

4. The method according to claim 3, wherein the determining of the detected angular position is performed using measuring data of a Hall sensor.

5. The method according to claim 3, wherein the first, predetermined torque is chosen such that the first load jump leads to locking of the electric motor.

6. The method according to claim 3, wherein the first load jump is detected by identifying locking of the electric motor.

7. The method according to claim 1, wherein the method comprises a calibration of the actuator, the calibration comprising:

controlling, by the motor control, the electric motor to move the actuating element in the direction towards the absolute mechanical end stop with a second, predetermined torque until a second load jump is detected in the electric motor, controlling, by the motor control, the electric motor to move the actuating element away from the absolute mechanical end stop with a third, higher torque to detach the actuator from the absolute mechanical end stop and to remove it by a predetermined distance, controlling, by the motor control, the electric motor to move the actuating element away from the absolute mechanical end stop with a fourth, low torque until a third load jump is detected in the electric motor, and registering, by the motor control, the position of the actuator at the third load jump as the soft reference position;

wherein a closing movement of the actuating element is in the direction towards the mechanical end stop and an opening movement is in an opposite direction.

8. The method according to claim 7, wherein the calibration further comprises:

controlling, by the motor control, the electric motor to move the actuating element away from the absolute mechanical end stop with a fifth torque over the predetermined distance, verifying, by the motor control, the movement of the actuating element, and controlling, by the motor control, the electric motor to move the actuating element, with a sixth torque, in the direction towards the absolute mechanical end stop over a second, larger predetermined distance.

9. The method according to claim 1, wherein the load is detected based on a motor current of the electric motor.

10. The method according to claim 1, wherein the predetermined distance is provided via a predetermined number of commutating steps of the electric motor.

11. The method according to claim 1, wherein the method is used for controlling a linear actuator and the actuating element comprises a linearly moveable shaft or a linearly moveable needle.

12. The method according to claim 1, wherein the soft reference position is updated based on a control command which occurs when the actuator is approaching a closed position of the actuator or follows the actuator being in the closed position.

13. An actuator, comprising:

an electric motor;

an actuating element coupled to the electric motor, the actuating element comprising a movable shaft or needle; and a printed circuit board comprising a motor control, the motor control being configured to:

control the electric motor to move the actuating element in a direction towards an absolute mechanical end stop until a last registered soft reference position has been reached and then to overtravel the last registered soft reference position by a predetermined distance, detect a load of the actuator, and update the registered soft reference position based on the detected load, wherein the registered soft reference position is updated via the motor control when a load increase or load decrease is detected in the electric motor.

14. The actuator according to claim 13, wherein the registered soft reference position is updated by the motor control based on a load increase or load decrease when the soft reference position is overtravelled.

15. The actuator according to claim 13, wherein the actuator is configured, for calibration, to:

provide a second torque in a closing direction in a direction towards the absolute mechanical end stop of the actuator until a second load jump is detected in the electric motor, provide a third, higher torque in an opening direction opposed to the closing direction to detach the actuator from the absolute mechanical end stop and to remove it by a predetermined distance, provide a forth, low torque in the opening direction until a third load jump is detected in the electric motor, and register the position of the actuator at the second load jump as a soft reference point.

16. The actuator according to claim 15, wherein the actuator is configured, after calibration, to
provide the first torque in the opening direction for a predetermined distance,
verify a rotation of a rotor, and
provide the first torque in the closing direction for a second, larger predetermined distance.

17. The actuator according to claim 13, wherein the actuator is a linear actuator and the actuating element comprises a linearly moveable shaft.

18. The linear actuator according to claim 17, wherein the linearly moveable shaft comprises a thread engaging a thread of a nut, connected to a rotor of the electric motor in a torque-proof manner, so that a rotary movement of the rotor leads to a linear displacement between the shaft and the nut.

19. The linear actuator according to claim 18, wherein the linear actuator comprises an elastic element, which biases the linearly moveable shaft in the direction towards the absolute mechanical end stop, and
wherein the nut is supported to be linearly moveable in the linear actuator and rests on a support surface of the linear actuator opposite the elastic element so that when the linear actuator overtravels the soft reference position, the nut performs a linear movement in the linear actuator.

20. The linear actuator according to claim 19, wherein the support surface is a top surface of a ball bearing of the linear actuator.

21. The linear actuator according to claim 18, wherein a rotary movement of the shaft is prevented between the shaft and a housing of the linear actuator.

22. The actuator according to claim 13, wherein the actuator is configured to overtravel the last registered soft reference position by a predetermined distance at least regularly whenever approaching the soft reference position is provided.

* * * * *